United States Patent [19]
Joseph

[11] Patent Number: 5,992,173
[45] Date of Patent: Nov. 30, 1999

[54] FOOD PRODUCT PACKAGE CHILLER FOR DISSIPATING PACKAGING HEAT

[75] Inventor: Jon T. Joseph, Greeley, Colo.

[73] Assignee: Monfort, Inc., Greeley, Colo.

[21] Appl. No.: 08/814,571

[22] Filed: Mar. 10, 1997

[51] Int. Cl.[6] .................................................. F25D 17/02
[52] U.S. Cl. ................................ 62/374; 134/68; 134/131
[58] Field of Search ........................ 62/374, 375; 34/208, 34/218; 134/68, 131

[56] References Cited

U.S. PATENT DOCUMENTS

| | | | |
|---|---|---|---|
| 4,208,855 | 6/1980 | Schirmer | 53/417 |
| 5,317,818 | 6/1994 | Ward | 62/374 |
| 5,551,334 | 9/1996 | Cody | 34/208 |
| 5,622,196 | 4/1997 | Luongo | 134/131 |
| 5,630,327 | 5/1997 | Kiczek et al. | 62/374 |

*Primary Examiner*—William E. Tapolcai
*Attorney, Agent, or Firm*—Sheridan Ross P.C.

[57] ABSTRACT

A food product package chiller is disclosed that dissipates heat generated in the packaging process so that there is a reduction of heat imparted to the food product. In particular, when the present invention is applied to, e.g., heat shrink vacuum sealed packages of raw meat or fish, it is useful in: (a) reducing fluid buildup in the packages; (b) extending the shelf life of the enclosed food product; and (c) reducing the number of packages with leaks, wherein the reduction of heat from the packaging induces a stiffening of the packaging. In one embodiment, the chiller of the present invention cools package surfaces of meat products to just above freezing in a coolant dispensing chamber and subsequently removes any residual coolant from the package surfaces in a second chamber.

30 Claims, 7 Drawing Sheets

FOOD PRODUCT PACKAGE CHILLER FOR DISSIPATING PACKAGING HEAT

FIELD OF THE INVENTION

The present invention relates to the cooling of food product packages, and in particular to a reduction of heat generated during the packaging of uncooked products such as raw meat or fish.

BACKGROUND OF THE INVENTION

In the packaging of food products, often times the packaging process generates heat that is conveyed to the food product. For example, the widespread use of heat shrinking for vacuum sealed packaged food products typically generates heat that is conveyed to the packaged food product. Moreover, the heating of such food products can: (a) decrease the shelf life of food products by accelerating the growth of bacteria; and (b) cause the vacuum sealed packaging to be less resistant to tears and punctures while in a heated condition. This is particularly problematic in the packaging of such foods as raw meat and fish, wherein it is common practice to package these food items by vacuum sealing in bags and subsequently heating the packages in, for example, a "shrink tunnel" for inducing the vacuum sealed bags to further shrink about their corresponding contained food product. Accordingly, it would be advantageous to have an apparatus and method for immediately chilling such packaged foods exiting the packaging process (e.g., the shrink tunnel), wherein the chilling process chills but does not necessarily freeze the packaged food product and leaves each package substantially dry so that the packages can subsequently be packed, en masse, in, for example, paper or cardboard boxes for transport without box failure due to moisture.

SUMMARY OF THE INVENTION

The present invention is a food product package chiller that chills packaged foods that have been undesirably heated in the packaging process. In particular, the present invention is useful for dissipating the heat to which vacuum packaged food products are purposefully exposed in order to further shrink the vacuum package bag that has been vacuum sealed about the food product. Accordingly, the package chiller of the present invention includes a conveyor that conveys packaged foods such as raw meat (e.g., beef, pork and poultry) or fish through a coolant dispensing chamber where a coolant, such as a liquid (e.g., chilled water or brine) or a gas (e.g., $CO_2$ or nitrogen), is injected or sprayed into the chamber for chilling the food package surfaces having an excessive amount of heat. In one embodiment of the present invention, the coolant is chilled water having a temperature in the range of 33° F. to 36° F. and most preferably, 34° F. Thus, it is an aspect of the present invention that the package is chilled preferably but is not subject to so cold a temperature as to induce frost or ice to accumulate on the package surface.

Additionally, once the food package has been chilled in the coolant dispensing chamber, the package may enter a drying area for removing any excess or residual coolant (e.g., chilled water) remaining on the package. In particular, the drying area may include a chamber for blowing air across the surfaces of the packages. Thus, it is a further aspect of the present invention that when a packaged food product exits the present invention, that it is substantially dry as well as chilled.

Thus, the following advantages may be provided by the present invention: (a) a decrease in the number of heat shrunk vacuum sealed food product packages that leak, in that the present invention stiffens typical vacuum sealed plastic bags, thereby making them more resistant to tears and/or punctures; (b) a reduction in the fluid (known in the art as "purge") that can accumulate in, e.g., vacuum sealed bags of meat; and (c) a reduction in growth of bacteria within the packaged food product.

Other features and benefits of the present invention will become apparent from the detailed description and the accompanying figures contained hereinafter.

BRIEF DESCRIPTION OF THE DRAWINGS

FIG. 6 shows sprayers for dispensing of additional coolant within the chilling tunnel 14.

DETAILED DESCRIPTION

Figure 1:
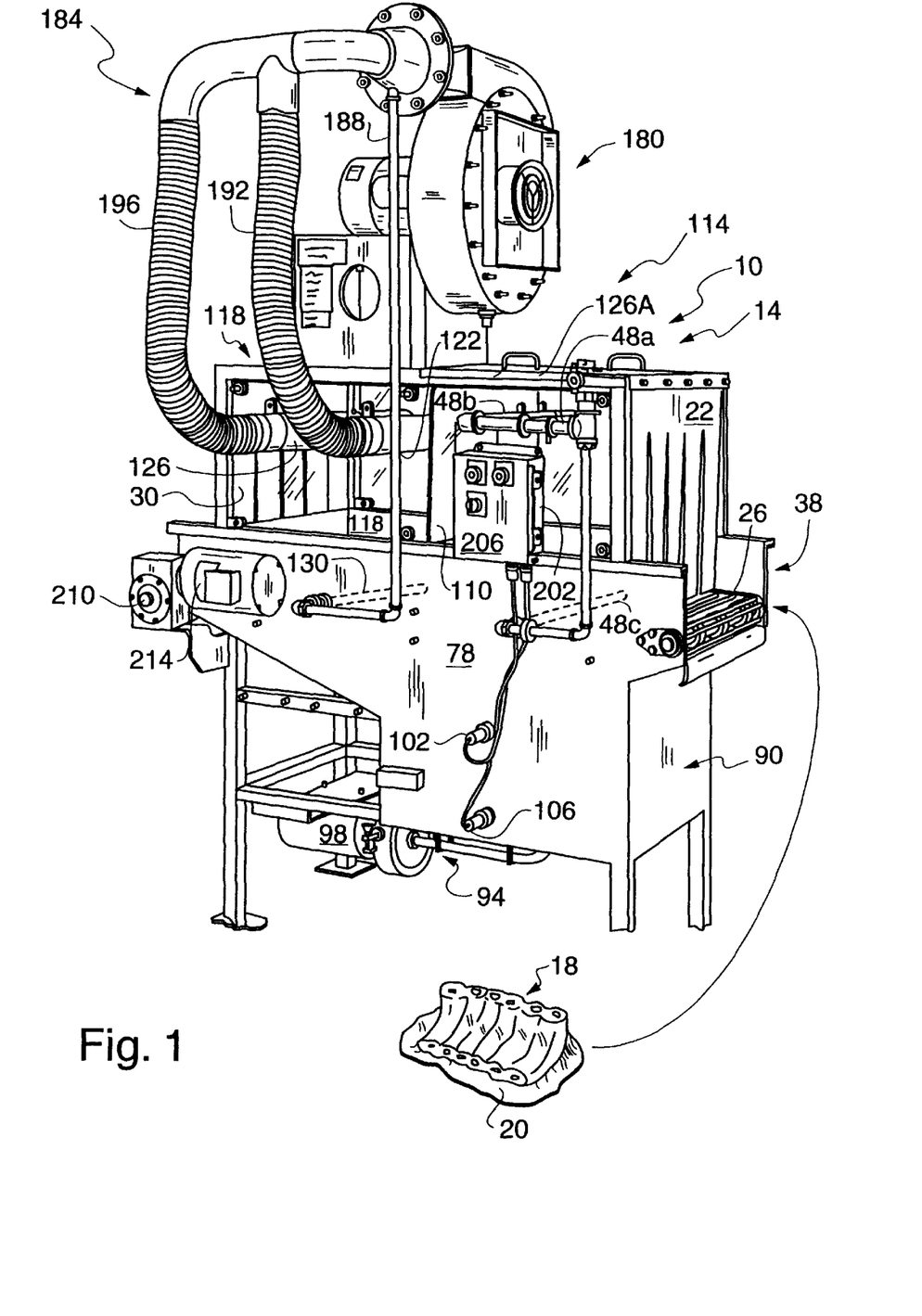
FIG. 1 is a perspective view of the package chiller 10 of the present invention.

FIG. 1 presents an exterior oblique view of the package chiller 10 of the present invention. Included in the package chiller 10 is a horizontally extending chilling tunnel 14, wherein when a food product package 18 traverses the chilling tunnel, the package has its exterior surfaces cooled or chilled, as will be described in detail hereinbelow. In the present embodiment, the chilling tunnel 14 has an entrance provided by a flexible entry curtain 22 made preferably from ¼ inch thick food grade belting, wherein the curtain material is flexible enough to allow food product packages 18 to easily enter the chilling tunnel 14 and yet sufficiently stiff so that the atmosphere within the chilling tunnel is not substantially dissipated through the vertical slits in the entry curtain 22. The food product packages 18 are conveyed past the entry curtain 22 and into the chilling tunnel 14 on a conveyor belt 26. The conveyor belt 26 traverses the entire length of the chilling tunnel 14 between the entry curtain 22 and the food product exit curtain 30. Additionally, the conveyor belt 26 also extends horizontally beyond these curtains for allowing smooth transition of food products into and out of the package chiller 10. In particular, the extension of the conveyor belt 26 outwardly beyond the curtain 22 is configured at both a height and an operating speed that substantially matches a typical conveyor 32 producing packages 18, e.g., vacuum sealed and heat shrunk packages of raw meat, fish or vegetables. However, it is an aspect of the present invention to also be adjustable in both the height and the speed of the conveyor belt 26 to allow the present invention to be operationally compatible with substantially all fish and meat heat shrinking machines (e.g., shrink tunnels used on vacuum sealed packages).

Figure 2:
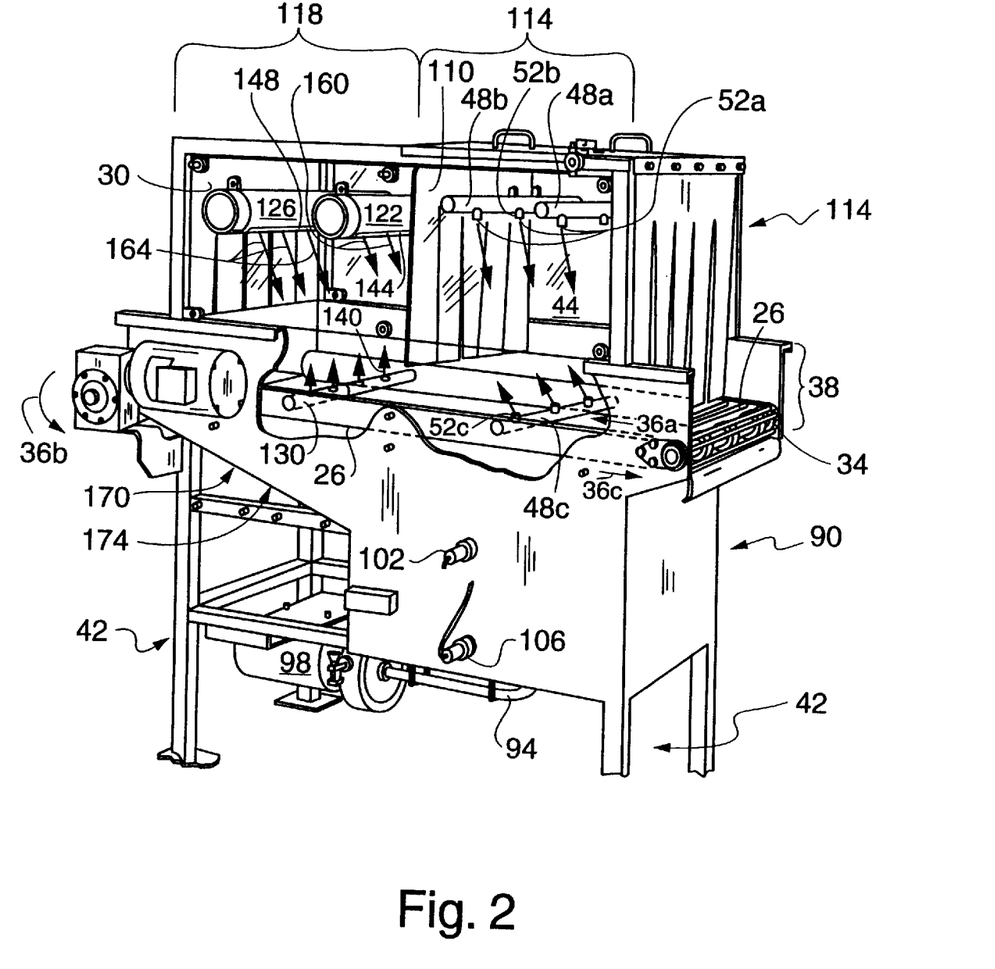
FIG. 2 is a perspective view of the internals of the chilling tunnel 14 through which food packages travel, wherein this view illustrates the internal components of the tunnel.

As best shown in FIG. 2, conveyor belt 26 is a continuous belt of stainless steel rods 34 having a length that substantially traverses the width of the belt. In one embodiment, the conveyor belt 26 is an Omni-Grid belt manufactured by Ashworth. As will become evident hereinbelow, this belt is advantageous in that there is a high percentage of open area in the belt that allows for a substantially free exchange between the ambient conditions within the chilling tunnel 14 above the conveyor belt 26 and below (at least a portion of) this belt. Further note that in the present embodiment, the extent of the belt in the directions of movement (FIG. 2, direction arrows 36a, 36b and 36c) is approximately 5 feet and the width across the belt is approximately 26 inches.

The chilling tunnel 14, in addition to being bounded below by the conveyor belt 26, is bounded vertically on the sides by vertical stainless steel plate extensions 38 of a lower support assembly 42 wherein the assembly 42 provides both support for the chilling tunnel 14 and storage for a coolant, such as chilled water, used in the chilling tunnel 14, as described hereinbelow. Note that the extensions 38 provide smooth, continuous sides to the chilling tunnel 14 for a height sufficient so that the maximum expected height of a packaged food product, such as packaged meat, is below the height of the extensions 38. Accordingly, when the present invention is used for the chilling of wholesale meat packages, this height can be approximately six inches. The sidewalls of the chilling tunnel 14 above the extensions 38 are transparent, plastic windows approximately ½ inch thick, wherein the windows allow for easy visual inspection of the food product packages as they are being chilled, and easy jam detection. Additionally, the plastic for these windows 44 is a scratch-resistant material that can also supply sufficient structural support for other package chiller 10 components, as will be discussed hereinbelow.

In one embodiment of the chiller 10, there are a plurality of spray bars 48 (FIG. 2) internal to the chilling tunnel 14 and traversing its width between the opposing sides of the chilling tunnel 14. The present embodiment includes three such bars 48a, 48b and 48c for spraying, for example, a liquid coolant (e.g., chilled water or brine) or a gaseous coolant (e.g., $CO_2$ or nitrogen) on a food product package 18. If the coolant is water, it is preferred that it have a temperature to 33° F. to 36° F. However, in an alternative embodiment, tap water having a temperature in the range of 50° F. to 60° F. may also be used as the coolant. Alternatively, if brine is used as the coolant a temperature below 32° F. may be used, and if $CO_2$ or nitrogen is used as the coolant, then a much lower temperature range may be provided, such as −20° F. to −50° F.

Note that since the food product packages 18 include for example, meat or fish as the food product, and since the packages are, in one embodiment, vacuum package bags without any other packaging support, these packages typically lie relatively flat upon the rods 34 of the conveyor belt. Accordingly, the spray bars 48 and the plurality of nozzles 52 are positioned so that there is a greater amount of coolant, such as chilled water, sprayed on the tops of the packages 18 than on their undersides. Additionally, the nozzles on the spray bars 48 have been positioned to assure that, regardless of the orientation of a package 18 on the conveyor belt 26, adequate spray from the nozzles 52 contact the package for effective chilling. However, since most of the packages will generally be in a center portion of the width of the conveyor belt 26, a greater amount of spray is directed from the nozzles 52 toward this center portion. Accordingly, using the present invention, one is able to better control the direction, temperature and amount of coolant application than, for example, in an immersion system. Moreover, contamination problems with an immersion bath are eliminated using the present invention.

Figure 5:
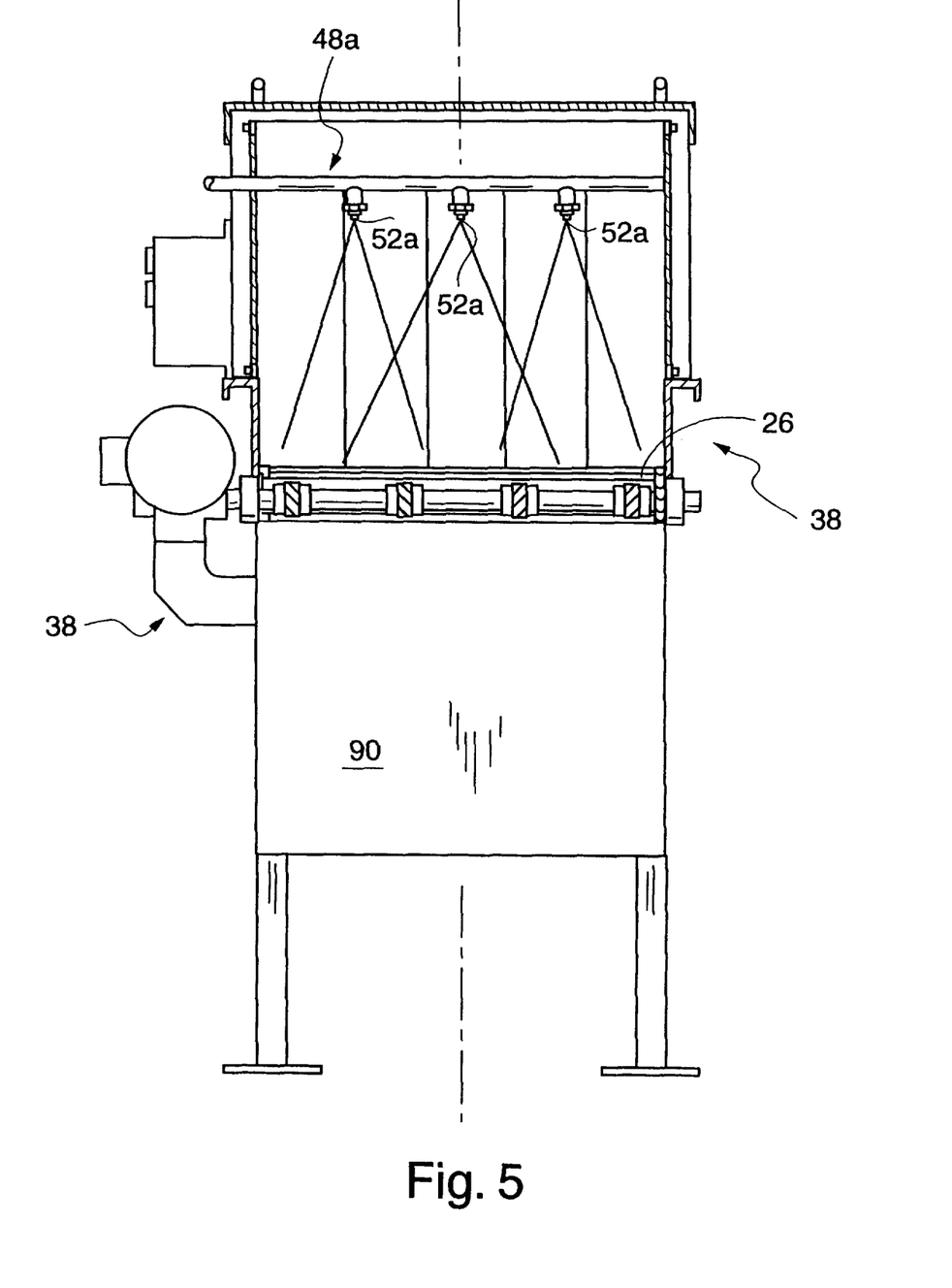
FIG. 5 illustrates the dispensing of a chilling coolant first encountered by a package entering the chilling tunnel 14.
Figure 6:
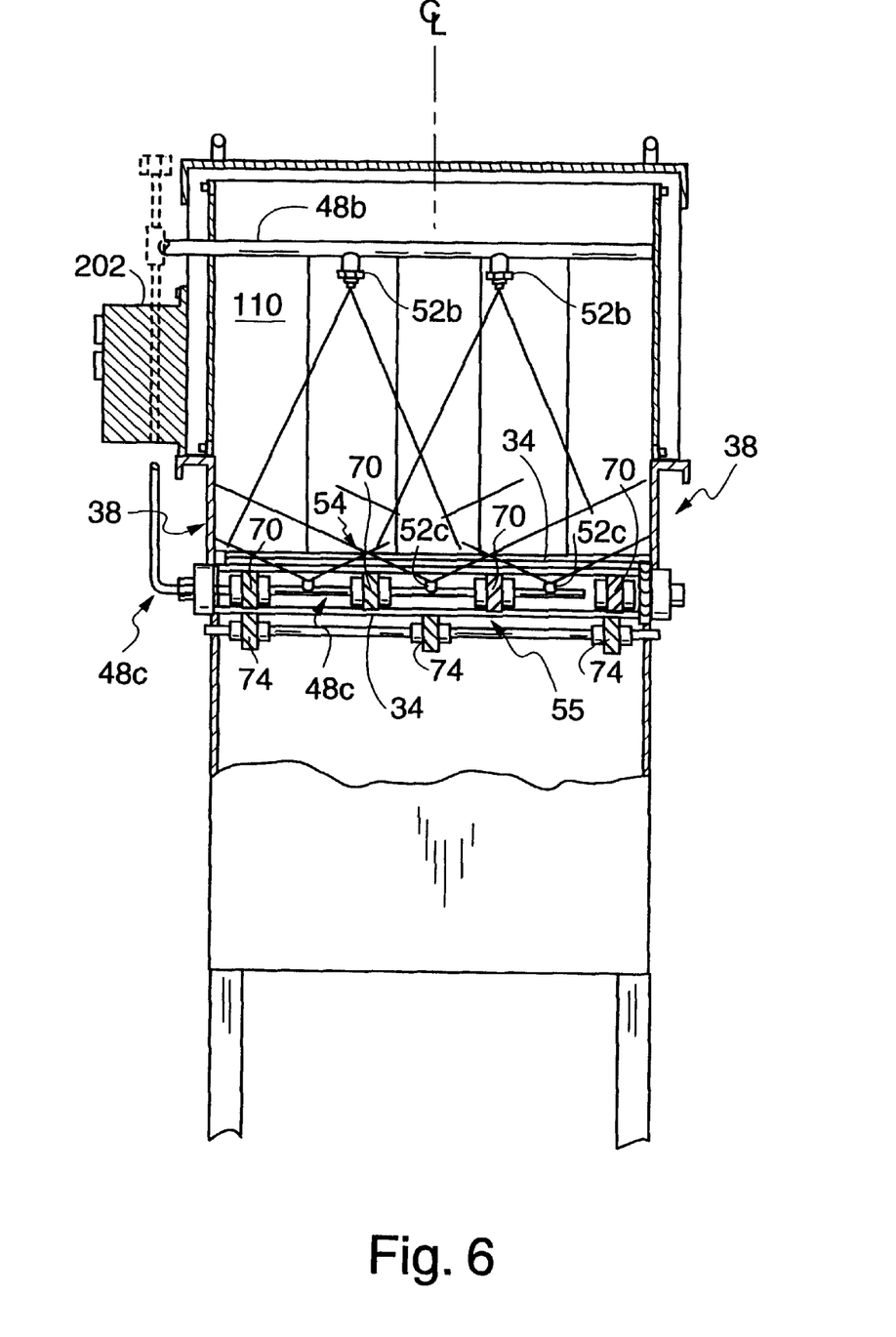
FIG. 6 is a cross-sectional view of the chilling tunnel 14 indicated by the cross section arrows 6 of FIG. 3. Accordingly.

Referring now to FIGS. 5 and 6, the positioning of the nozzles 52 on each of the spray bars is illustrated along with the spray pattern from the nozzles. In FIG. 5, the spray bar 48a is shown with its attached three nozzles 52a positioned across the spray bar 48a so that a center nozzle 52a sprays the center area of the conveyor belt 26 width with an angle of spray in the range of 40° to 50° and more preferably, approximately 46°. Additionally, the center spray nozzle 52a is, in one embodiment, a VeeJet-style nozzle manufactured by Spraying Systems Co., wherein the spray pattern is a flat or sheet-type spray (i.e., the thickness of the spray in the direction of the chilling tunnel 14 length is shallow in comparison to the coverage of the spray along the width of the tunnel). Moreover, this center nozzle provides a 4 to 4.5 gallons per minute (GPM) spray of chilled water at 20 psi pressure and more preferably, approximately 4.2 gallons per minute at 20 psi. Referring now to the side nozzles 52a, these nozzles are also VeeJet nozzles that produce a flat or sheet-type spray oriented similarly to the spray from the center nozzle. However, the side nozzles have a reduced GPM (at 20 psi) and a reduced angular extent across the width of the conveyor belt 26. In particular, each of the side nozzles 52a provide 1.75 to 2.5 GPM through an angle of 33°.

Referring now to the spray bar 48b, as illustrated in FIG. 6, note that spray nozzles 52b are also VeeJet nozzles each having a similar spray configuration and orientation as the nozzles 52a. However, note that the positioning of the nozzles 52b is different from those of 52a, thereby producing a spray pattern that can contact a food product package 18 to be chilled at different orientations and thereby provide a greater likelihood that substantially the entire top surfaces of a food package 18 will be in contact with the sprayed coolant regardless of the irregular configurations provided by, for example, various cuts of meat and any included bone. Note that in the embodiment of FIG. 6, the spray bar 48b has its nozzles 52b offset approximately three inches from the center of the width of the conveyor belt 26 and that the angle of spray for each of the nozzles 52b is in the range of 40° to 50° at approximately 20 psi and providing a volume of spray of 2.5 to 3.0 GPM.

Figure 3:
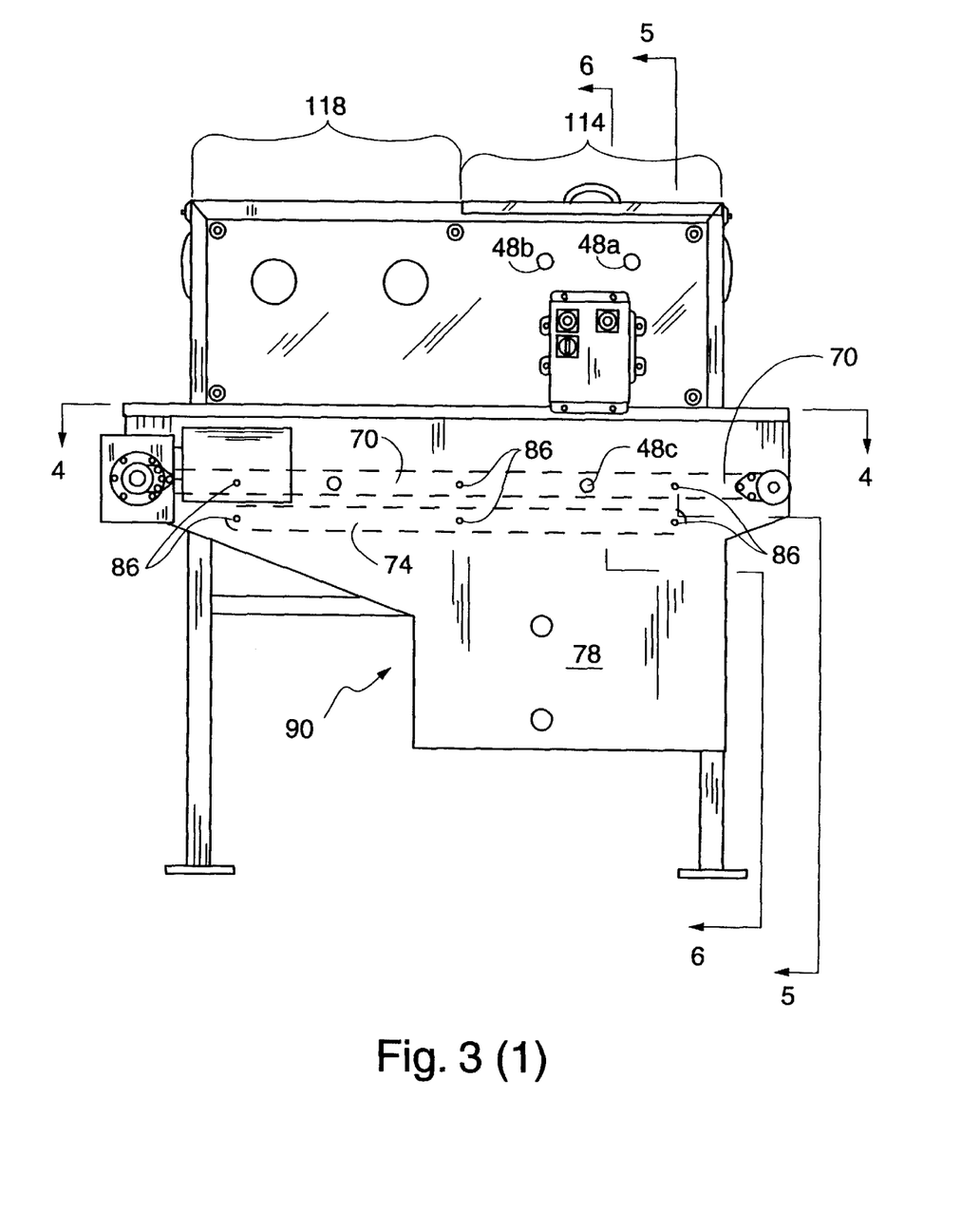
FIG. 3 is a side view of the present invention illustrating the position of various internal components.

FIG. 6 also illustrates the spray pattern from the nozzles 52c from a cross-sectional view, along the sectioning lines 6 indicated in FIG. 3. Note that the spray bar 48c is between the upper track 54 and the lower track 55 of the conveyor belt 26 and is held in place by the leftmost three upper support rails 70 (a side view of these rails is shown in FIG. 3). Due to the restricted vertical distance between the upper and lower tacks of the conveyor belt 26, the nozzles 52c are of a low profile-type. Accordingly, in one embodiment, these nozzles are FloodJet-style nozzles also manufactured by Spray Systems Co., wherein the nozzles provide a flat spray pattern as with the nozzles 52a and 52b. However, the nozzles 52c are oriented on the spray bar 48c so that the flat spray is directed at approximately 75° angle from an upwardly directed vertical axis so that the spray is directed away from the chilling tunnel 14 entry. However, other orientations are within the scope of the present invention. For example, the spray may be alternatively directed at angles in the range of approximately 60° to 80° from a vertical upward directed axis. Additionally, in some embodiments, the nozzles 52c may be oriented for directing their spray toward the chilling tunnel 14 entry. Further, note that the spray from the nozzles 52c subtends much wider angles than the other nozzles. In the present embodiment, the nozzles 52c provide a spray through angles in the range of 131° to 135° for water at 20 psi. More precisely, the spray angle for the center nozzle 52c is approximately 135° and approximately 133° for the other nozzles 52c.

Figure 4:
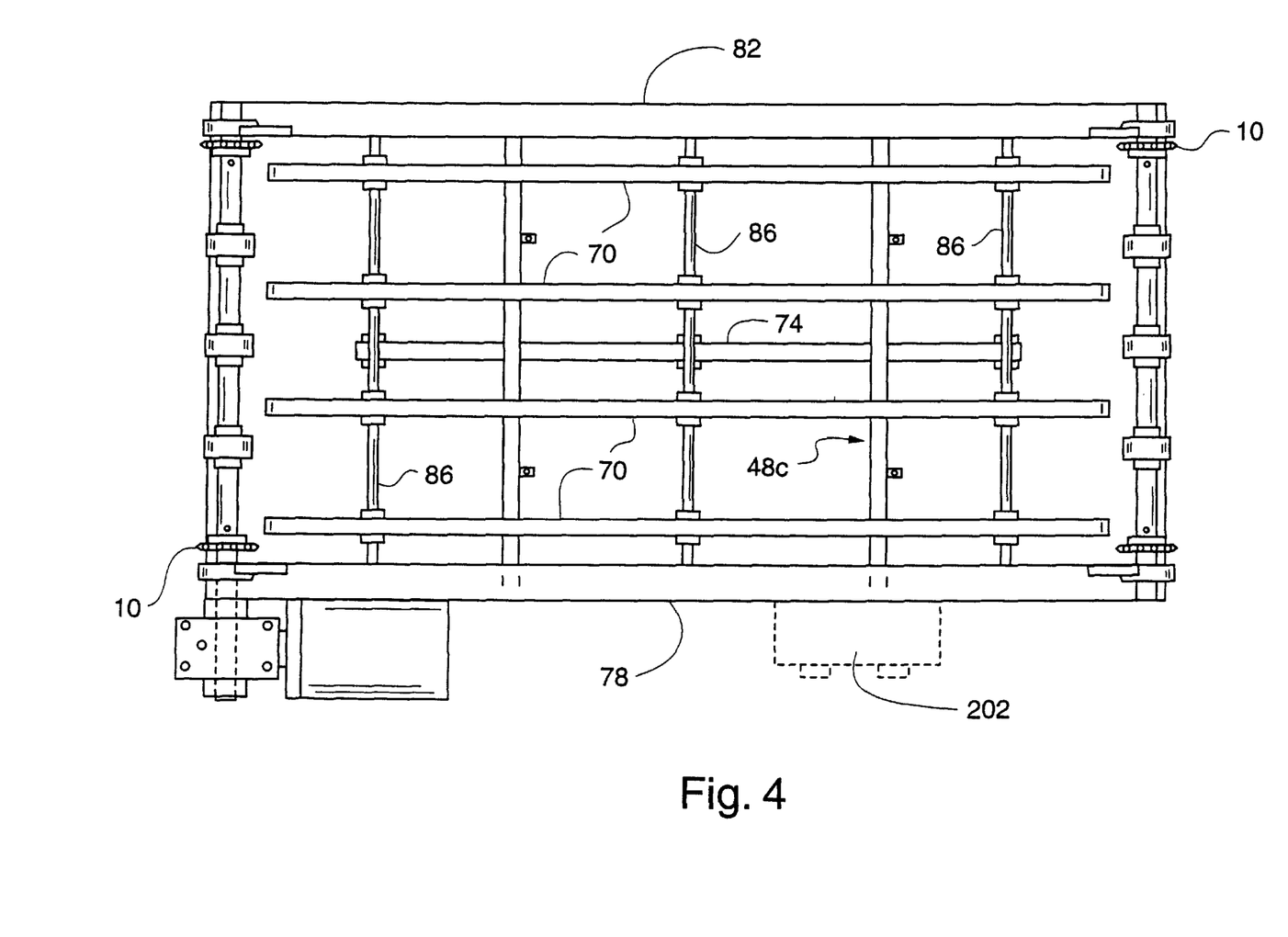
FIG. 4 is a top cross-sectional arrows 4 of FIG. 3.

In addition to the upper conveyor support rail 70 that can support the upper track of the conveyor belt 26, there are also lower conveyor support rails 74 (FIG. 3) for supporting the lower track 55. Note that the upper and lower conveyor support rails are fixedly attached to the sides 78 and 82 via rail stabilizing cross members 86 (FIG. 4). Further note that the sides 78 and 82 also form the sides of a chilled water holding tank 90 that is substantially below the spray bars 48 so that this tank receives the coolant that is sprayed during the chilling process. Note that in the present embodiment, the holding tank 90 has a capacity of approximately 40 gallons and is made of 12 gauge stainless steel to prevent corrosion and to facilitate maintaining sanitary conditions, as one skilled in the art will appreciate. Additionally, note that the bottom of the tank (not shown) is sloped toward a sump which is connected via drain line 94 to a pump 98 for disposing of the water within the holding tank 90. In particular, the pump 98 pumps the coolant to, for example, a recycling site so that the coolant may be reused in the chiller 10.

Proximity switches 102 and 106 are utilized in activating and deactivating the pump 98 according to the water level in the holding tank 90. In particular, when water in the tank is detected at a level in proximity of switch 102, the pump is activated and when the proximity switch 106 detects that the water level is substantially at or below this switch, the pump is deactivated.

It is important aspect of the present invention that coolant may be utilized efficiently in chilling the food product packages 18. In particular, when chilled water is used as the coolant at 20 psi, the present chiller 10 uses less than 25 gallons per minute and typically approximately 20 gallons per minute.

Referring again to the chilling tunnel 14 (e.g., FIG. 2) of the present embodiment, as a package 18 proceeds beyond the spray bar 48b, another curtain 110 is provided to partition the chilling tunnel 14 into two chambers, namely, a coolant dispensing chamber 114 and a blow off chamber or drying chamber 118, wherein the coolant dispensing chamber includes the spray bars 48 for chilling the surface of each input package 18 and the drying chamber 118 subsequently dries the packages so that there is little remaining moisture coolant on their surfaces that could cause a failure of, for example, cardboard boxes in which a plurality of the packages 18 are packed for shipment. Note that the curtain 110 is substantially identical to the curtain 22, with the exception that it is approximately six inches shorter, to allow the free escape of drying air forced into the drying chamber 118, as will be explained hereinbelow.

The drying chamber 118 includes two upper blow off tubes 122 and 126 for directing air to blow over the packages and thereby remove water from the top portion of such packages. Additionally, note that the drying chamber 118 also includes a lower blow off tube 130 for blowing air substantially vertically from between the upper and lower tacks of the conveyor belt 26, as illustrated by the air direction arrows 140. Note that the upper blow off tubes 122 and 126, respectively, have air exhaust slots 144 and 148, respectively, for directing the air towards the packages entering the drying chamber 118. Additionally, note that each of the upper blow off tubes 122 and 126 are rotatably adjustable so that their respective air exhaust slots can direct air at an angle desired by an operator of the present invention (e.g., approximately −30° to +30° from a downwardly directed vertical axis). However, it is preferred that the slots 144 and 148 be directed at an angle toward the curtain 110, as illustrated by the air direction arrows 160 and 164. Note that it is an aspect of the present embodiment of the present invention for blowing air to dry the packages after they have been chilled that the air currents within the drying chamber 118 generate a wind sheer effect about the surface of products in the drying chamber to thereby facilitate removing water from package surfaces. Additionally, note that below the drying chamber 118 is a sloped support portion 170 for receiving the coolant that is blown off the packages in the drying chamber 118 and depositing the coolant into the holding tank 90. Accordingly, this sloped support portion 170 has sides that are included within the sides 78 and 82, as well as having a sloped underside 174 for draining water into the holding tank 90 that is removed from the packages 18 in the drying chamber.

Fan 180 (FIG. 1) mounted above the drying chamber 118 urges air into the blow off air delivery ducting 184. Note that a first air conduit 188 provides air to the lower blow off tube 130 while the larger, flexible air conduits 192 and 196 that are attached to upper blow off tubes 122 and 126, respectively.

Additionally, the package chiller 10 includes an electrical controller 202 having a front panel 206 with the following operator indicators and activators: (a) a conveyor belt 26 drive control push/pull switch for starting and stopping the conveyor belt; (b) a push/pull switch for starting and stopping the fan 180; and (c) a three-way switch for the pump 98, wherein there are on/off setting as well as an automatic setting allowing the pump to cycle automatically according to the coolant level in the holding bank 90 (as indicated by proximity switches 102 and 106).

Various alternative embodiments for the chiller 10 are also within the scope of the present invention. For example, the spray bars 48 may be positioned so that they traverse the length of the coolant dispensing chamber 114 instead of its width as illustrated above.

In another alternative embodiment of the chiller 10 wherein a cooled gas is injected, via gas injectors (not shown but functionally comparable to the spray nozzles 52), into the coolant dispensing chamber 114 as the coolant, note that there may be no need for a subsequent chamber 118. That is, assuming a chilled gas such as $CO_2$ or nitrogen is used, it is believed that the moisture content on the packages (18) may be, in many cases, insufficient to necessitate the use of the drying chamber 118.

In operation, the package chiller 10 may have its package entry end adjacent to a package exit for a shrink tunnel 300 or other package heating apparatus. Accordingly, the conveyor belt 26 is preferably at a height that matches the height of a conveyor 32 moving packages 18 out of a heat imparting apparatus (e.g., a shrink tunnel 300). Thus, when a package 18 reaches the end of the conveyor for the heat imparting apparatus, it is received onto the conveyor belt 26. In one embodiment, the speed of the conveyor belt 26 is approximately 44 feet per minute, a speed that closely matches the package 18 exit speed of a typical vacuum packaging machine. In an alternative embodiment, the chiller 10 can have a variable speed for the conveyor belt 26, via controls on the controller 202. However, regardless of the conveyor 26 speed control, it is within the scope of the present invention that the speed of the conveyor be effective for preventing packages 18 from an upstream packaging machine from backing up at the entry of the chiller 10. In fact, it is preferred, in at least one embodiment, that the conveyor belt 26 operate at a package take-up rate that is somewhat faster than the rate of packages 18 exiting an upstream packaging machine.

Upon entering the chilling tunnel 14, the heated surfaces of each package 18 is immediately chilled by contact with a coolant such as chilled water sprayed according to the embodiments of the present invention discussed hereinabove. In particular, it is an aspect of the present invention that the coolant chill, but no freeze, the package surfaces so that they may be easily dried prior to mass packing in cardboard containers. Thus, once the packages have been exposed to the coolant in the coolant dispensing chamber 114, they move past the flexible curtain 110 and into the drying chamber 118. Thus, as described hereinabove, the residual coolant remaining on the packages 18 is blown off leaving the packages dry and substantially colder so that upon exiting the drying chamber 118 through the exit curtain 30, the packages are both chilled and substantially dry. It is important to note that in addition to chilling the packages, when the chiller 10 is used on vacuum sealed plastic bags, commonly used in meat packaging, the chilling process also stiffens the plastic, thereby enhancing the structural integrity of the packaging (i.e., the plastic bag). Accordingly, the enhanced stiffness results in the package being less prone to suffer tears and/or punctures, thereby reducing the number of packages incurring a leak.

In yet further embodiments (not shown), a recycling of coolant is provided so that any possible contamination of the coolant is remedied. For example, coolant collected after it contacts packages 18 is conveyed through appropriate filters to remove undesirable contaminants. Thus, in the event a package 18 is broken and coolant is collected that may include bacteria or other matter derived from the food item within the package, it is possible to remove such material from the coolant without jeopardizing the hygienic integrity of the cooling operation.

In a further alternative embodiment, the controller 202 may additionally include controls for varying one or more of: the amount of coolant introduced into the coolant dispensing chamber 114, the coolant temperature, the rate at which air is introduced into the drying chamber 118 and/or the speed of the conveyor belt 26.

The foregoing discussion of the invention has been presented for purposes of illustration and description. Further, the description is not intended to limit the invention to the form disclosed herein. Consequently, variation and modification commensurate with the above teachings, and within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A package chiller, comprising:

a coolant dispensing chamber for injecting a coolant into an atmosphere of an interior of the chamber so that substantially all surfaces of each of a plurality of food product packages are cooled, said product packages being vacuum packaged to conform to contours of food products therein, at least some of said contours of said food products being substantially non-deformable, wherein heat has been imparted to the surfaces of each of said food product packages from a packaging process;

a conveyor for conveying said food product packages through the coolant dispensing chamber, said conveyor including a conveyor belt having a supporting side for supporting said food product packages;

wherein for each of said food product packages, said supporting side maintains the package in substantially a same position with respect to a portion of said supporting side contacting the package when the package is conveyed through said coolant dispensing chamber;

wherein said conveyor belt has a sufficient amount of open space for allowing a substantially free exchange of said coolant between said supporting side and an opposite side of said conveyor belt;

a plurality of coolant injectors for injecting said coolant into said atmosphere, wherein said coolant contacts surfaces of each of said food product packages from above said food product package and from below said food product package, wherein one of said injectors below said food product package directs coolant through said open space for contacting one of said surfaces of said foods product package open to said opposite side of said conveyor belt; and a drying area for removing residual coolant from surfaces of said food product packages after said food product packages exit said coolant dispensing chamber, wherein the resulting food product package is substantially free of coolant upon exiting said drying area.

2. A package chiller as claimed in claim 1, wherein said food products include irregularly shaped portions of one of meat and fish.

3. A package chiller as claimed in claim 1, wherein said packaging process includes a means for sealing the food product in a vacuum sealed package.

4. A package chiller as claimed in claim 1, wherein said packaging process includes a means for purposefully heating the surface to shrink the food product package about an enclosed food product.

5. A package chiller as claimed in claim 1, wherein said coolant is one of water, brine, $CO_2$ and nitrogen.

6. A package chiller as claimed in claim 1, wherein said coolant is injected into the coolant dispensing chamber at a temperature in a range of 33° F. to 36° F.

7. A package chiller as claimed in claim 1, wherein said coolant is tap water in a range of 55° F. to 60° F.

8. A package chiller as claimed in claim 1, wherein said coolant dispensing chamber includes nozzles for injecting said coolant into the atmosphere within the chamber.

9. A package chiller as claimed in claim 1, wherein said plurality of coolant injectors are attached to a plurality of bars on opposite sides of the conveyor, wherein said bars supply coolant to said injectors.

10. A package chiller as claimed in claim 1, wherein said plurality of injectors includes a spray nozzle that sprays the coolant through an angle of at least 40°.

11. A package chiller as claimed in claim 1, wherein said plurality of injectors includes a spray nozzle that sprays the coolant in the range of 2.5 to 5.0 gallons per minute.

12. A package chiller as claimed in claim 1, wherein said drying area is adjacent said coolant dispensing chamber and said conveyor travels through said drying area.

13. A package chiller as claimed in claim 1, wherein said drying area includes a substantially enclosed drying chamber for reducing moisture on the package after the package exits the coolant dispensing chamber.

14. A package chiller as claimed in claim 13, wherein the drying chamber includes at least one drying tube for blowing air about the package.

15. A package chiller as claimed in claim 12, wherein there are at least two tubes for blowing air in the drying chamber, wherein a wind shear is provided about the package.

16. A package chiller as claimed in claim 1, wherein said food product packages are cooled effectively to toughen said surfaces of said food product packages for inhibiting breaches in said food product packages.

17. A package chiller as claimed in claim 1, wherein said food product packages are not squeezed when conveyed through said coolant dispensing chamber.

18. A food product package chiller, comprising:
- a coolant dispensing chamber for injecting a coolant into an atmosphere of an interior of the chamber so that substantially all surfaces of each of a plurality food product packages are cooled, said product packages being vacuum-packaged to conform to contours of food products therein, at least some of said contours of said food products having a non-deformable shape;
- a drying chamber for reducing coolant on the surfaces of the food product packages;
- a conveying means for conveying the food product packages through the coolant dispensing chamber and to the drying chamber;
- wherein said conveying means includes a conveyor belt having a supporting side for supporting said food product packages;
- wherein said conveyor belt has a sufficient amount of open space for allowing a substantially free exchange of said coolant between said supporting side and an opposite side of said conveyor belt;
- a plurality of coolant injectors for injecting said coolant into said atmosphere, wherein said coolant contacts surfaces of each of said food product packages from above said food product package and from below said food product package, wherein one of said injectors below said food product package directs coolant through said open space for contacting one of said surfaces of said food product package open to said opposite side of said conveyor belt.

19. A food product package chiller, as claimed in claim 18, wherein the coolant is injected into the coolant dispensing chamber from between rods of the conveying means.

20. A food product package chiller, as claimed in claim 18, wherein the coolant is above 32° F.

21. A food product package chiller, as claimed in claim 18, wherein there is a flexible partition between the coolant dispensing chamber and the drying chamber.

22. A food product package chiller, as claimed in claim 18, wherein each of said food product packages has its surfaces included in a plastic vacuum sealed package contacting the food product.

23. A food product package chiller, as claimed in claim 22, wherein traversal of one of the coolant dispensing chamber and the drying chamber induces at least one of said surfaces of the vacuum sealed package to stiffen.

24. A food product package chiller, as claimed in claim 18, wherein prior to each of said food product packages entering said coolant dispensing chamber, heat is imparted to at least one of the surfaces of the package from a packaging process providing a shrink wrapping of the food product.

25. A food product package chiller, as claimed in claim 24, wherein said conveyor means conveys each of the food product packages at least at a rate equal to the rate at which the food product packages exit the packaging process.

26. A food product package chiller, as claimed in claim 18, wherein said conveyor means includes a stainless steel conveyor belt having spaced apart rods.

27. A food product package chiller, as claimed in claim 18, wherein the drying area includes at lest one blow off device for blowing air about each of the food product packages, wherein the blown air reduces the coolant on the surfaces of said food product packages.

28. A package chiller, as claimed in claim 27, wherein an angle at which air exits the blow-off device is adjustable through an angle in the range of −30° to +30° from vertical.

29. A package chiller as claimed in claim 18, wherein said conveying means does not invert said food product packages.

30. A package chiller as claimed in claim 18, wherein said conveying means includes for each of said food product packages a substantially planar surface for contacting said food product package throughout said package being conveyed through said coolant dispensing chamber.

\* \* \* \* \*